(12) United States Patent
Hitzler et al.

(10) Patent No.: US 10,309,666 B2
(45) Date of Patent: Jun. 4, 2019

(54) FILTER CARTRIDGE, ROLLER, AND AIR HUMIDIFIER

(71) Applicant: VENTA-LUFTWAESCHER GMBH, Weingarten (DE)

(72) Inventors: Alfred Hitzler, Wolpertswende (DE); Guido Wegner, Bad Waldsee (DE)

(73) Assignee: Venta-Luftwaescher GmbH, Weingarten (DE)

( * ) Notice: Subject to any disclaimer, the term of this patent is extended or adjusted under 35 U.S.C. 154(b) by 0 days.

(21) Appl. No.: 15/807,745

(22) Filed: Nov. 9, 2017

(65) Prior Publication Data
US 2018/0128507 A1 May 10, 2018

Related U.S. Application Data

(63) Continuation of application No. PCT/EP2016/057570, filed on Apr. 7, 2016.

(30) Foreign Application Priority Data

May 12, 2015 (EP) ..................................... 15167255

(51) Int. Cl.
*F24F 6/06* (2006.01)
*C02F 1/00* (2006.01)
(Continued)

(52) U.S. Cl.
CPC ................. *F24F 6/06* (2013.01); *C02F 1/001* (2013.01); *C02F 1/283* (2013.01); *C02F 1/42* (2013.01);
(Continued)

(58) Field of Classification Search
CPC ........ F24F 6/16; F24F 2003/1617; F24F 6/06; F24F 3/1603; F24F 2006/006;
(Continued)

(56) References Cited

U.S. PATENT DOCUMENTS

| 1,181,886 A | * | 5/1916 | High | F24F 6/06 261/30 |
|---|---|---|---|---|
| 2,343,820 A | * | 3/1944 | Thornton | F24F 6/06 239/220 |

(Continued)

FOREIGN PATENT DOCUMENTS

| EP | 10 2010 010 394 A1 | 9/2011 |
|---|---|---|
| JP | 4270168 * | 5/2009 |

(Continued)

OTHER PUBLICATIONS

EPO translation of JP 2015-127614 (Year: 2015).*

(Continued)

*Primary Examiner* — Stephen Hobson
(74) *Attorney, Agent, or Firm* — Burr & Brown, PLLC

(57) ABSTRACT

A filter cartridge for filtering water, for use in an air humidifier, having a storage chamber for storing filter material, and having at least one opening for feeding to the storage chamber and/or for releasing from the storage chamber the water to be filtered is proposed. For the purpose of relatively quick filling, the filter cartridge is formed to be arranged in a container, containing water to be filtered, such that the filter cartridge can project at least partially into the water stored in the container, with the at least one opening formed both as a water inlet for feeding water from the container into the storage chamber and as a water outlet for discharging water from the storage chamber into the container. A roller, an air humidifier and a filtering method are also proposed.

13 Claims, 2 Drawing Sheets

(51) Int. Cl.
*C02F 1/28* (2006.01)
*C02F 1/42* (2006.01)
*C02F 1/50* (2006.01)
*C02F 1/68* (2006.01)
*F24F 3/16* (2006.01)
*F24F 6/16* (2006.01)
*F24F 6/00* (2006.01)
*B01D 33/15* (2006.01)

(52) U.S. Cl.
CPC ............ *C02F 1/50* (2013.01); *C02F 1/68* (2013.01); *F24F 3/1603* (2013.01); *F24F 6/16* (2013.01); *B01D 33/15* (2013.01); *C02F 2201/006* (2013.01); *C02F 2303/04* (2013.01); *C02F 2303/22* (2013.01); *C02F 2307/12* (2013.01); *F24F 2003/1617* (2013.01); *F24F 2006/006* (2013.01); *F24F 2006/065* (2013.01); *Y02A 50/21* (2018.01)

(58) Field of Classification Search
CPC ... F24F 2006/065; B01D 33/15; B01D 33/17; C02F 1/50; C02F 1/283; C02F 1/42; C02F 1/68; C02F 1/001; C02F 2201/006; C02F 2303/04; C02F 2307/12; C02F 2303/22; Y02A 50/21
See application file for complete search history.

(56) References Cited

U.S. PATENT DOCUMENTS

| | | | | | |
|---|---|---|---|---|---|
| 3,309,021 | A | * | 3/1967 | Powers | F24D 19/0082 159/906 |
| 3,479,801 | A | * | 11/1969 | Yamasaki | A61M 16/16 261/92 |
| 3,733,062 | A | * | 5/1973 | Bracich | F24F 6/06 261/92 |
| 3,886,074 | A | * | 5/1975 | Prosser | C02F 3/082 210/150 |
| 5,804,071 | A | * | 9/1998 | Haeffner | B01D 33/11 210/393 |
| 6,500,331 | B2 | * | 12/2002 | Massignani | B01D 33/15 210/155 |
| 7,125,486 | B1 | * | 10/2006 | Chuang | E02B 8/023 210/155 |
| 8,491,709 | B2 | * | 7/2013 | Takeuchi | A61L 9/015 204/212 |
| 8,500,106 | B2 | * | 8/2013 | Tsuda | F24F 6/06 261/92 |
| 9,341,385 | B2 | * | 5/2016 | Ahn | F24F 6/06 |
| 2006/0011062 | A1 | | 1/2006 | De La Fuente | |
| 2008/0127820 | A1 | * | 6/2008 | Park | A61L 9/122 95/1 |
| 2008/0296235 | A1 | * | 12/2008 | Murray | B01D 21/2433 210/776 |
| 2012/0161343 | A1 | * | 6/2012 | Ha | F24F 6/06 261/92 |
| 2013/0334113 | A1 | | 12/2013 | Erlich | |
| 2014/0145355 | A1 | | 5/2014 | Shimizu | |
| 2015/0115482 | A1 | * | 4/2015 | Jang | F24F 6/00 261/24 |
| 2017/0165597 | A1 | * | 6/2017 | Kotler | B01D 33/23 |

FOREIGN PATENT DOCUMENTS

| | | | |
|---|---|---|---|
| JP | 4270168 B2 | | 5/2009 |
| JP | 2010 117061 | * | 5/2010 |
| JP | 4740910 B2 | | 8/2011 |
| JP | 2011-237050 A1 | | 11/2011 |
| JP | 2015-127614 | * | 7/2015 |
| WO | WO2015098984 | * | 7/2015 |

OTHER PUBLICATIONS

EPO translation of JP 2010 117061 (Year: 2010).*
IDS provided translation of JP4270168 (Year: 2009).*
Korean Office Action (Application No. 10-2017-7035309) dated Apr. 26, 2018 (with English translation).
Extended European Search Report (Application No. 15167255.7) dated Oct. 21, 2015.
International Search Report and Written Opinion (Application No. PCT/EP2016/057570) dated Jun. 27, 2016.
European Examination Report (Application No. 15167255.7) dated Jun. 28, 2016.
English translation of International Preliminary Report on Patentability (Chapter 1) (Application No. PCT/EP2016/057570) dated Nov. 23, 2017, 7 pages.
Russian Office Action (Application No. 2017143124/12(074355)) dated Oct. 16, 2018.

* cited by examiner

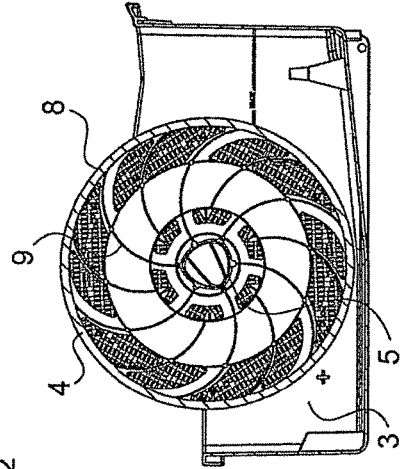
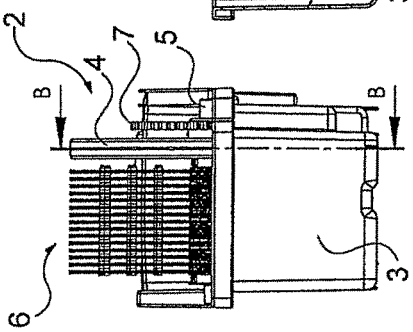
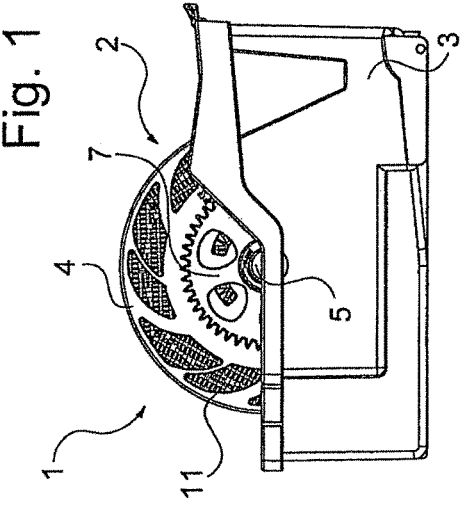
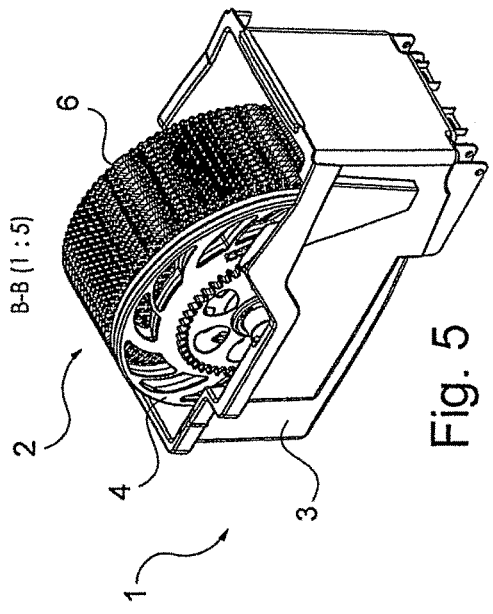
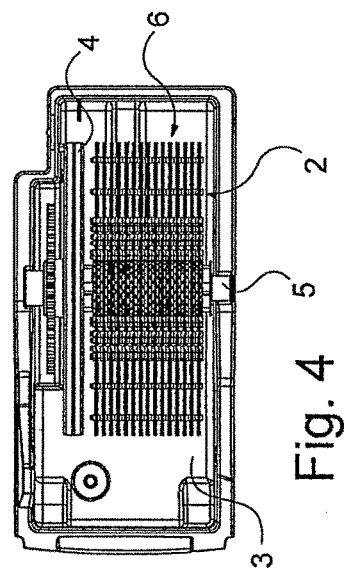

FILTER CARTRIDGE, ROLLER, AND AIR HUMIDIFIER

CROSS REFERENCE TO RELATED APPLICATIONS

This application is a continuation of International Application No. PCT/EP2016/057570 filed Apr. 7, 2016, which designated the United States, and claims the benefit under 35 USC § 119(a)-(d) of European Application No. 15167255.7 filed May 12, 2015, the entireties of which are incorporated herein by reference.

FIELD OF THE INVENTION

The present invention relates to a filter cartridge for filtering water, in particular, for softening water and/or cleaning water, for use in an air humidifier or the like, and a roller for the humidification of air by way of cold evaporation, to an air humidifier, and a method for filtering water, in particular, for softening water and/or cleaning water, in a container in an air humidifier or the like.

BACKGROUND OF THE INVENTION

Air humidifiers, which are used to increase the air humidity in rooms containing relatively dry air in order thus to create a room climate which is more beneficial to health, are known from the prior art. In particular, the principle of cold evaporation, in which water is stored in the container of an air humidifier and the water is brought into contact with the air by means of rotating rollers, can be used in this case. For this purpose, the room air, in turn, is drawn in from the outside and is guided with the aid of a blower via the rotating, moistened rollers, so that the air is able to absorb moisture. Devices of this type can also be used to filter particles from the air. In order to be able to reduce scaling by the water which is used, the water is cleaned, for example, in that a corresponding filter is installed in the feed line, prior to being introduced into the container or into the air humidifier. Furthermore, the water can be provided with additives which are intended to prevent bacterial contamination. Also known is the adding of fragrances in order for these to be released to the room air.

SUMMARY OF THE INVENTION

It is the object of the present invention to simplify the handling of an air humidifier or of a filtering method for water in such a way that, in particular, a relatively quick filling process is made possible.

The filter cartridge according to the present invention serves in principle for filtering water, in particular, for softening water and/or cleaning water, and can be used in an air humidifier or the like. The cartridge also has a storage chamber for storing filter material, in particular, ion exchange resin, activated carbon or the like. In order that the water to be filtered can pass into the storage chamber and, there, can come into contact or interact with the filter material, at least one opening is provided.

Accordingly, the filter cartridge according to the present invention is characterized in that it is formed to be arranged in a container, containing water to be filtered, such that the filter cartridge can project at least partially into the water stored in the container, and in that, furthermore, the at least one opening is formed both as a water inlet for feeding water from the container into the storage chamber and as a water outlet for discharging water from the storage chamber into the container. This makes it possible for the water which is stored in the container and which is to be used for air humidification to no longer have to be pumped through the filter material. The filtering can take place in the container or in the storage chamber itself, that is to say the filling of the container can be carried out without delay. The water can in principle pass through the same opening into the storage chamber to the filter material, and also flow back out of this opening again into the actual container. It is equally possible that the water passes through an opening to the filter material, and flows through another other opening, if present, back into the container. A pumping process for the water through the filter cartridge can be avoided, however.

Further advantages of the present invention are the possibility of simplified maintenance and of a particularly simple change of the filter cartridge. If, specifically, a filter is installed for example in a feed line to the container, then a relatively cumbersome maintenance has to be performed in principle, in particular it has to be ensured that, despite the installed filter, the line continues to be sealingly closed off and exhibits no leakage. In the case of such a conventional filter, clogging of the filter can already ensure that the feed line bursts or further damage occurs. These disadvantages can be avoided in the case of the filter cartridge according to the present invention. Furthermore, in the case of the filter cartridge according to the present invention, relatively favorable production is likewise made possible.

In principle, two designs are possible, namely that the filter cartridge stands in the water statically, or else that the filter cartridge is moved relative to the water or to the water stored in the container. In the case of the preferred embodiment, that the filter cartridge is moved through the water, it is, in particular, possible for a relatively large quantity of water to come into contact with the filter material.

Additionally, the movement of the filter cartridge can result in mixing of the water, so that a more homogeneous distribution of the filtered water can be present. This measure can therefore have a particularly advantageous effect if water which has just been filtered is mixed in the container with water which has not yet been filtered or has not yet been so highly filtered.

In an advantageous embodiment of the present invention, a mounting device for mounting in the container, in particular a hub for fastening to a shaft and/or axis of rotation, is provided. The filter cartridge can in principle be arranged in the container via a fastening device or via a movable mount. The choice of the attachment also depends inter alia on whether static fastening of the filter cartridge or whether movement of the filter cartridge should be possible. The filter cartridge can advantageously perform rotational movement if it is mounted movably, so that the filter cartridge, for example, rotates in the water or, during rotation, dips into the water partially or completely and exits the water again. Such a movement of the filter material relative to the water correspondingly allows the filtering effect to be increased and the water to be mixed better. If a shaft or an axis of rotation is available for performing the rotational movement, it is then possible for the filter cartridge to be fastened to the shaft in a particularly simple manner via a hub such that the rotational movement of the shaft results in the filter cartridge also performing a rotational movement.

Specifically when the filter cartridge performs a rotational movement, the cartridge can, in one exemplary embodiment of the present invention, advantageously be formed as a disk which is preferably formed rotationally symmetrically with respect to the axis of rotation. The formation as a disk or as a filter disk allows a particularly favorable filter geometry for filtering to be provided, because the disk has a particularly large surface area in comparison with its total volume, that is to say a particularly large amount of water can come into contact with filter material. In the direction of the extent of the axis of rotation, a disk is of relatively thin form, that is to say the filter material can be distributed over a large area, and so the water to be filtered can also pass to the filter material without having to cover long distances. A rotationally symmetric formation allows rotational movement to be simplified in a mechanical sense, because no imbalances arise, and there is no change over time as to the extent to which the filter cartridge currently dips into the water.

Although, in principle, the water is not actively pumped through the filter material, it is nevertheless possible that at least one transport structure for receiving and releasing water is provided such that when the filter cartridge (and, with this, the filter material) is moved through the water, a relatively long lasting contact of the water with the filter material is made possible with the aid of the transport structure. As a result of this measure, the filtering, the effectiveness thereof and the degree of mixing of the stored water can therefore again be improved.

In an advantageous embodiment variant of the present invention, it is possible, for example, for scoop-like or spoon-like structures to be used as transport structures, so that, during the rotational movement of the filter cartridge, the water is received via the spoons or scoops, and is able to make contact with the filter material over a relatively long period of time. The transport structures can extend for example radially outwardly in relation to the axis of rotation, in a manner similar to spokes on a wheel. In order to form a scoop-like or spoon-like structure, the transport structures can also be formed such that they are curved toward the outside. The curved structure thus forms a depression in which the water which passes into said depression can still be held for a while.

Correspondingly, the transport structure can thus preferably extend, in the case of a disk, between the hub and the boundary of the disk, in a manner similar to a spoke. Advantageously, the transport structure consequently has a plurality of functions, specifically this serving not only for receiving water, but also for the stabilization because it forms a supporting structure between the hub and the boundary. Moreover, the transport structure can advantageously also be used to form a separating structure inside the filter cartridge, for example, to form individual compartments, this being advantageous in particular if different filter materials or even other fillings (e.g. hygiene products or fragrances) are to be stored in individual compartments.

In a particularly preferred refinement of the present invention, a combination of two relative movements is used, specifically, on the one hand, firstly the filter material is moved through the water to be filtered. On the other hand, in turn, the water to be filtered can additionally move relative to the filter material, which is particularly advantageously achieved in that the at least one transport structure is formed to transport into its upper region in the direction of gravitational force water received during rotation about the axis of rotation in at least one direction of rotation, and to release the water in the region from the transport structure such that the water is able to flow downward in the direction of gravitational force along the filter cartridge, in particular along the filter material. For example, the filter cartridge can be formed for this purpose as a rotating disk, whose lower region in the direction of gravitational force dips into the water which is stored in the container.

The water is able to pass into the storage chamber to the filter material through the openings of the filter cartridge. When the disk rotates, the filter material is thus moved through the water, part of the water can be carried via the transport structures, and is lifted out of the stored water during the rotation. Since the transport structures are open at a position, in particular, if they are formed as scoops or spoons, the water can be received in a simple manner, when the transport structure dips into the stored water, and flow out again from a specific angular position during the course of the rotation. Generally, during the rotation of a filter disk, this will occur when the scoop points obliquely upward, or even vertically upward, counter to the direction of gravitational force. In this region, the water will thus flow out of the transport structure and is consequently able to flow past further filter material and pass downward back into the container to the other, stored water. Advantageously, this can also result in the time of the filtering being increased, because the water is filtered not only in the lower region of the container, when the filter material dips in there and is guided through the water, but it can also be carried along and, when trickling down the filter cartridge or filter disk, additionally be filtered. This embodiment variant thus makes it possible for the effectiveness of the filter cartridge to be increased.

Furthermore, this arrangement also offers the advantage that, for example, in an application in connection with an air humidifier, the filter cartridge itself is able to perform the function of a roller for carrying out the cold evaporation or for filtering the air. This means that, during operation, the filter cartridge not only serves for filtering the water but can also humidify the air and/or filter the air. If the filter cartridge is then arranged, for example, on the roller of an air humidifier, then an optimal utilization of space can advantageously be realized: although part of the roller, which part is used for the actual air humidification, is "replaced" by the filter cartridge, the filter cartridge can, however, in turn perform the actual function of the plate stack of the roller, that is to say the air humidification.

As already mentioned above, individual separating structures can also be formed and used as a separating wall for separating off individual compartments inside the storage chamber, which can turn out to be particularly useful if different contents are to be introduced into individual compartments. An ion exchange resin or activated carbon, for example, can be considered as filling materials for the compartments. However, it is also conceivable to use fragrances or, for example, hygiene products, preferably for cleaning and disinfecting the water, as filling materials. In any case, fragrances are often used in air humidifiers. The fragrances can be instilled, for example, from outside into the stored water as drops. Due to the possibility of feeding the fragrances via the filter cartridge, it is, in particular, possible for targeted dosing to be realized, specifically over a relatively long period of time. The fragrances do not therefore have to be replenished again in the containers at such short time intervals, but can be continually released in a precisely dosed manner during the operation of the filter cartridge. Moreover, compartments likewise make it possible for it not always to be necessary, even during replenishment, for the entire filter cartridge to be replaced or refilled, but for this process also to be realizable compartment by compartment.

For example, it can also be the case that for instance the actual filter material, for example, the activated carbon or the ion exchange resin, has a different lifetime to the stored fragrances hygiene products. In order for it not to be necessary for the entire filter cartridge or the entire contents thereof to be replaced, the replacement can in each case occur compartment by compartment, and so therefore also only the substances which have actually been used up or whose effectiveness has been exhausted are replaced. Hygiene products can, in particular, be such substances which allow sterilization or avoid for example fungal growth. A filter cartridge with corresponding compartments is therefore advantageously able to be used in a versatile and flexible manner.

In order that the water can pass to the filter material very well, and the filter material in turn remains in the storage chamber and cannot escape, the openings can advantageously be delimited by net-like, water-permeable structures. Generally, it is necessary here to weigh up how large the meshes of such a net structure should be in order that the filter material cannot pass through if, in this case, for example a granular material is involved. The openings can, therefore, also be delimited by permeable membranes with fabric or felt structures, as long as sufficient permeability for water is still ensured.

In principle, the filter cartridge can be formed as a disposable article, so that it is simply replaced when the filling material (filter material, fragrances or hygiene products) is exhausted with regard to its effect. However, it is also conceivable that the filter cartridge is formed to be openable and re-closable in order to be able to empty and refill the storage chamber. This measure can thus avoid waste. It is also conceivable that it is possible for the cartridges to be returned to the manufacturer and refilled at the factory. In particular, in this connection, it is also conceivable that the filter materials, the fragrances or the hygiene products are formed in each case as a related replacement article, for example, as a compressed block or as a tablet (so-called "tab"), and can simply be inserted into the corresponding compartment in order to be able to simplify the replenishment or replacement process.

Specifically fragrances or hygiene products can also be formed as water-soluble solids which dissolve in water over time and then completely vanish so that, in this case, the compartment is empty and has to be refilled.

An air humidifier for the humidification of air by way of cold evaporation comprises a roller in order to bring the water and the air to be humidified into contact with one another. In an application in connection with room air, water is frequently used as liquid because the water content in the room air is decisive for this purpose. However, it is in principle also conceivable for the cold evaporation principle to be carried out with other liquids. The roller according to the present invention has a shaft and at least one plate, wherein the at least one plate is arranged coaxially in relation to the shaft so that rotation about the shaft can be achieved. The roller comprises corresponding plates, which can dip into the water, in order, in particular, by way of this measure to be able to increase the surface area in comparison with a, for example, cylindrical roller. The wetted plates can thus come into contact with the air much more effectively and over a significantly larger area in order then to release the moisture.

In the operating state, the roller according to the present invention dips at least partially into the liquid or into the water. The part of the roller which dips into the water generally comprises the plates of the roller, wherein the corresponding plate sections are wetted and, when the previously dipped and thus wetted part of the plate is situated outside the liquid during the further course of the rotation, releases water to the room air by way of cold evaporation. Correspondingly, the roller according to the present invention is characterized in that a filter cartridge according to the present invention or a filter cartridge according to an exemplary embodiment of the present invention is used as part of the roller. Consequently, the advantages already mentioned above can be correspondingly used.

A structurally particularly simple and expedient arrangement can be realized in that, in an embodiment variant of the present invention, the filter cartridge is attached to the shaft. This makes it possible for the filter cartridge to be moved along simultaneously with the plates of the roller and for no further mechanism to be in principle necessary in order to move the filter material through the water.

If the filter cartridge has additional transport structures, in particular, curved transport structures (in the form of a scoop- or spoon-like structure), then the transport structures can be arranged in relation to the roller in such a way that the belly side of the bend of the transport structure is situated on the side which faces away in the direction of rotation. Thus, during the rotational movement, the scoop- or spoon-like structures reach into the water and are thus able to receive the latter. This measure makes it, in particular, possible for the effectiveness of the filter cartridge to be increased.

In an embodiment of the present invention, the filter cartridge can be arranged parallel to at least one of the at least one plate. For mechanical reasons, this is frequently a particularly preferred arrangement because a plate and, in particular, a filter disk basically have a similar shape, and thus also the resistance during the movement through the water does not have to be significantly larger. Moreover, both, plates and filter cartridges, benefit from the fact that in this arrangement they are already able to dip partially into the water, are able to receive water or are moistened with water from the surface and are able to lift this out of the actual pool. The coupling of the filter cartridge to the plates results in these being moved synchronously in the same manner. Between the plates or the filter cartridge, it is in this case possible for an air gap to be arranged in each case such that here too contact between air and the water is possible or, in the case of the filter cartridge, that the water there can simply trickle down again.

Correspondingly, an air humidifier according to the present invention is characterized in that a filter cartridge according to the present invention or a roller according to the present invention for filtering water is used. In this case, the at least one opening of the filter cartridge is arranged in or on the container such that the water received for filtering by the filter cartridge from the container is released again into the container to the water which is not currently being received. An opening in the filter cartridge can thus be used for the flowing-in or the flowing-out of the water. In turn, in the container, water which has just been filtered and water which has not yet been filtered are mixed during each individual filtering process. In connection with a roller, an exemplary embodiment of an air humidifier comprises a motor drive for rotating the roller about the axis of rotation. Advantageously, the roller, or the plates of the roller, and the filter cartridge can be moved simultaneously. Otherwise, the dimensioning of the filter cartridge can also be selected similarly to the size of the plates, wherein it is often to be expected that the filter cartridge is formed to be thicker because of the filter material with which it has to be filled. However, the diameter of the filter disk can correspond to or be equal to the diameter of the plates. Advantageously, it is also made possible for existing air humidifiers to be able to be retrofitted in a simple manner in that, specifically, the filter cartridge is pushed onto the shaft of a roller. Depending on the spatial conditions, plates can be removed if appropriate, or else the filter cartridge is only additionally attached.

In a method according to the present invention for filtering water, in particular, for softening water and/or cleaning water, in a container, for storing water, in an air humidifier or the like, a container, for storing water, and a filter material is correspondingly used, wherein the filter material is moved in such a way that it is periodically dipped at least partially into the water and removed from the water again. Such a method is thus characterized in that the filter material is firstly moved substantially relative to the water. Advantageously, this allows the filling to be carried out without delay.

In particular, in an exemplary embodiment of the method according to the present invention, it is possible for a filter cartridge, a roller and/or an air humidifier according to the present invention to be used. As a result of this measure, the abovementioned advantages for the method can be used.

BRIEF DESCRIPTION OF THE DRAWINGS

An exemplary embodiment of the present invention is illustrated in the drawings and will be explained in more detail below, with further details and advantages being specified.

FIGS. 1 to 5 show, in different views, schematic illustrations of part of an air humidifier having a roller and a container according to the present invention;

DETAILED DESCRIPTION OF THE INVENTION

Figure 6:
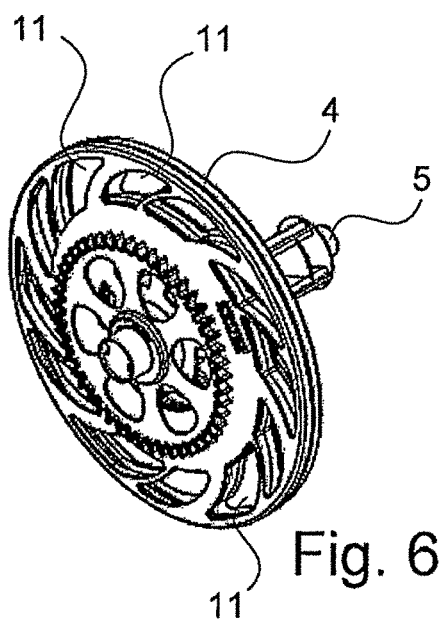
FIG. 6 shows a schematic illustration of a filter cartridge according to the present invention on a shaft.

FIGS. 1 to 5 schematically show part of an air humidifier 1 having a roller 2 and a container 3; the cover with the blower is not illustrated for simplicity. The view in FIG. 1 with regard to the roller 2 is directed directly toward the filter cartridge 4, that is to say, in the direction of the axis of rotation or the shaft 5. This part of the air humidifier 1 is illustrated in FIG. 2, wherein the view of the viewer is directed perpendicularly toward the shaft 5. The roller 2, which comprises the filter cartridge 4 and a plate stack 6, is mounted on the shaft 5. The individual plates in the plate stack 6 are connected to one another. They are arranged in a parallel manner such that individual intermediate spaces are situated between them. The plate stack 6 and the filter cartridge 4 are, as already described, arranged on the same shaft 5, wherein a spacing is likewise provided between them.

The water which is used for the air humidification is introduced in the container 3. It can further be seen that, with regard to its height, the axis 5 is arranged at such a height that the plate stack 6 and the filter cartridge 4 can dip in the water that is introduced into the container. A type of gearwheel 7, which forms part of the mechanism which belongs to the drive of the shaft 5, can likewise be seen in FIGS. 1 and 2.

The plates of the plate stack 6 serve for humidifying the air via cold evaporation. This means that the plates rotate and dip into the water during the rotation such that the surfaces of the individual plates of the plate stack 6 are moistened. The air humidifier 1 also has in principle a cover, which is situated above the container 3 or the plate stack 6 and through which air is blown in for example perpendicularly to the shaft from the top downward via a fan (not shown). Consequently, the air comes into contact with the plates of the plate stack 6 and, in the present exemplary embodiment, with the filter cartridge 4 too. The air is able to absorb moisture in particular via the plates 6, if appropriate also via the filter cartridge 4, and subsequently passes to the outside again. The plate stack 6 also has the advantage that it can also bring about a filtering effect, that is to say particles are separated off via the contact with the water so that a cleaning effect of the air comes into being.

A plan view from above into the container 3 is illustrated in FIG. 4. The air is generally blown in such that it flows, here according to the illustration in FIG. 4, into the plane of the drawing. An oblique view of the air humidifier 1 is illustrated in FIG. 5.

A schematic section B-B, which extends perpendicularly through the shaft 5, is illustrated in FIG. 3. The section B-B extends precisely through the filter cartridge 4. The section through the shaft 5 shows that the internal cross section of said shaft is not circular, but rather is flattened on three sides in comparison with a circle, in a manner similar to a Reuleaux triangle. A Reuleaux triangle is a geometric shape which is constructed starting from an equilateral triangle, wherein a circular arc having the edge length of the original triangle is drawn around each vertex. As a result, two adjacent vertices are connected to one another via a circular arc. It is also conceivable for other fitting shapes to be used here. A two-fold function can be considered here. Firstly, the cross section, deviating from the circular shape, of the shaft makes it easier for the plate stack or the filter cartridge to be mounted on the shaft in a rotationally conjoint manner. Secondly, this fitting shape allows coding to be performed, that is to say it is only possible to arrange on the shaft plates or filter cartridges whose hub has a corresponding fitting shape. This makes it possible to prevent unsuitable components being installed on the shaft, which components could possibly lead to malfunctions of, or damage to, the air humidifier. Also, it is generally sufficient to provide only that part of the shaft, with a deviating fitting shape in cross section, in which the plates or the filter disk are to be attached.

Figure 7:
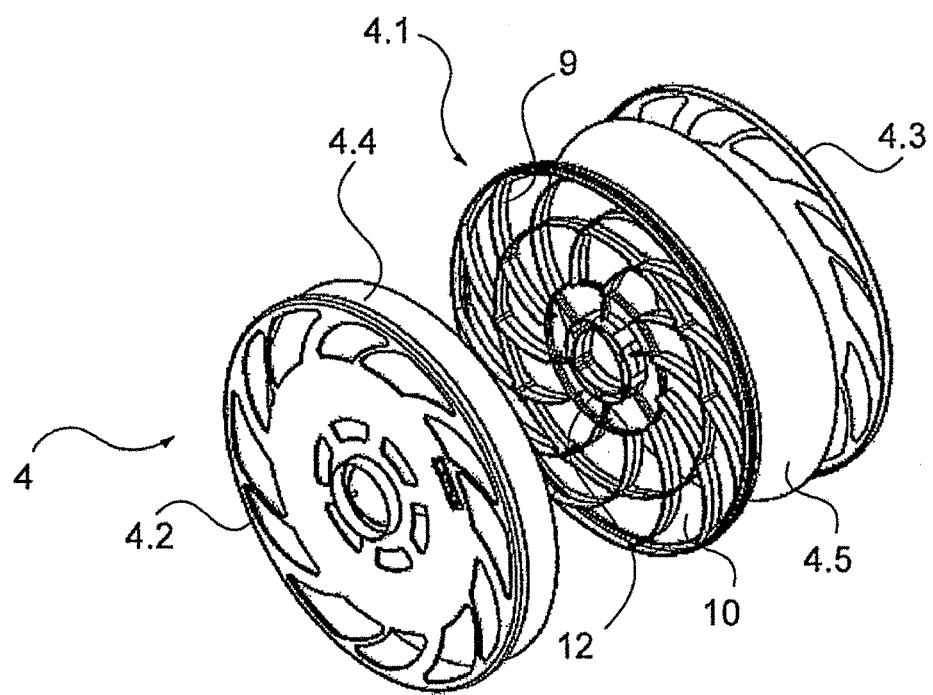
FIG. 7 shows a schematic exploded illustration for constructing a filter cartridge according to the present invention.

FIGS. 3 and 7 likewise show that separating structures 9, which are arranged like individual spokes, extend between the shaft 5 or the hub of the filter cartridge 4 and the outer boundary 8 of the filter cartridge 4. The spokes 9 extend in a curved manner, wherein the direction of rotation extends in the clockwise direction in FIGS. 3 and 7. The scoop-like separating structures 9 are thus able to receive water at the bottom of the container and to carry the water along until the water is finally "tipped out" upon further rotation and can flow down the filter cartridge 4. The individual compartments 10 between the separating structures 9 can receive filter material. In principle, both in the static case and in the case of a rotating filter cartridge 4, the water passes through the openings 11 into the interior of the filter cartridge 4 (cf. also FIG. 6). The fact that the separating strips 9 in each case separate individual compartments 10 from one another means that the compartments 10 can in each case serve as storage spaces filled with different filter material, with fragrances or hygiene products.

At the same time, the filter cartridge 4 is formed to be open via the openings 11, and so the water is in principle able to trickle out at each position. Particularly advantageously, it proves to be the case for this device that not only can it be easily replaced and if appropriate refilled, but that the container 3 can be filled immediately and, during operation, descaling can be performed simultaneously. This measure is generally completely sufficient to be able to prevent or significantly reduce scaling of the air humidifier 1.

As can be seen in FIG. 3, the plate stack 6 and the filter cartridge 4 almost reach the bottom of the container 3, and so optimal utilization of the water can occur even in the case of a low water level. The filter cartridge 4 is formed as a filter disk (disk-shaped).

The filter cartridge 4 can advantageously be used particularly well for the retrofitting of an air humidifier because, in the case of an air humidifier of said type, the roller drive is already integrated in the device. An additional drive motor can therefore be omitted. The filter disk 4 is placed only on the axis 5 of the evaporator roller 2 (cf. also FIG. 6). The filling process can therefore be carried out without delay, since the water does not first have to be forced through a filter in the inflow line. Apart from simplified maintenance and simple changing of the filters, the filter disk 4 can additionally promote the humidification process via the large surface area. The production can be realized in a very low-cost manner. The filter disk has a large filling volume and simultaneously a relatively small installation space. It is also stackable and can be packed in a space-saving manner. Due to the great storing possibility for filter material, the capacity of the filter cartridge or the lifetime thereof can be very long-lasting. Also, in relation to a smooth operation, the filter cartridge makes it possible for there to be in principle no risk of functional impairment even in the case of clogging of the filter material, for example of an ion exchange resin. Also, it is not possible for lines to burst so that the apparatus would be damaged or even that safety-related concerns could exist, even in the case of clogging of the filter material.

For a particularly hygienic operation, it is advantageously possible to use for example an ion exchange resin doped with silver ions as an ion exchange resin. Silver-impregnated activated carbons are also conceivable. Antibacterial granular materials or silver fabrics can also be integrated. If also a fragrance or perfume is to be released to the surroundings, a fragrance oil for room fragrancing can be stored in individual compartments. This can also interact with the water and be released thereto. The openings 11 can be provided with a PP/PA fabric, while the housing frame consists for example of PP/PE (abbreviations: PP: polypropylene, PE: polyethylene, PA: polyamide).

As is illustrated in FIG. 7, the filter cartridge 4 (here without filling of the compartments 10) can be for example of five-part form, namely composed of a framework 4.1 in which the separating structures 9 are likewise integrated in order to separate the compartments 10 from one another. There is likewise a hub 12 for fitting onto the shaft 5. There are furthermore provided two cover regions 4.2 and 4.3 by way of which the filter cartridge 4 is delimited laterally. Between the central structure 4.1 and the boundary structures 4.3 there is inserted in each case a fabric mat 4.4 and 4.5, respectively, which separates the compartments 10 from the outside. If the filter disk 4 is formed to be openable, it is possible, for reasons of hygiene, for example, for the structures 4.1, 4.2 and 4.3 to be cleaned (for example, in the dishwasher), while the fabrics are replaced, for example, and furthermore the compartments 10 are refilled.

LIST OF REFERENCE SIGNS

1 Air humidifier
2 Roller
3 Container
4 Filter disk
5 Shaft
6 Plate stack
7 Gearwheel
8 Outer boundary
9 Separating structures
10 Compartments
11 Opening
12 Hub
4.1 Framework
4.2 Cover region
4.3 Cover region
4.4 Fabric mat
B-B Section through filter disk

The invention claimed is:

1. A humidifier for humidifying air by cold evaporation of water, with a tank for the storage of the water, wherein a roller for humidifying air through cold evaporation of the water as well as a motorized drive for rotation of the roller about an axis of rotation are provided, wherein the roller has a shaft and at least one plate, wherein the at least one plate is arranged coaxially in respect to a shaft, wherein the roller is designed such that at least one plate dips at least partially into the water, in order for the moistened part exiting with further rotation from the water to release the water through cold evaporation of the air to be dehumidified, wherein the roller comprises a filter cartridge, which is designed for filtering water for use in a humidifier or the like, with a storage space for the storing of filter material, the filter material including at least ion exchange resin, activated carbon or the like, and with at least one opening in order to supply the water to be filtered to the storage space and/or to release it from the storage space, wherein the filter cartridge is designed to be arranged in the tank with the water to be filtered, so that the filter cartridge can protrude into the water stored in the tank, wherein the at least one opening is designed both as a water inlet for supplying water from the tank into the storage space as well as the water outlet for release of water from the storage space into the tank, wherein a mounting device is provided to be mounted in the tank, the mounting device defining a hub for fastening to the shaft and/or axis of rotation, wherein the filter cartridge is applied to the shaft, wherein the filter cartridge is applied to the shaft, wherein the filter cartridge, having the at least one opening is arranged in and/or on the tank such that the water absorbed by the filter cartridge from the tank for the filtering is released again into the tank to the water which has not yet been absorbed, wherein the filter cartridge has at least one transport structure for the absorption and release of water, wherein the at least one transport structure is designed as a separation wall for the separation of individual compartments within the storage space, wherein at least two of the compartments are mutually filled with different filling materials, wherein at least one of the following filling materials is provided: ion exchange resin, active carbon, a fragrant substance, and a hygiene agent, which is designed for the purification and/or disinfection of the water.

2. A humidifier for humidifying air by cold evaporation of water, with a tank for the storage of the water, wherein a roller is provided for humidifying air through cold evaporation of the water as well as a motorized drive for rotation of the roller,
wherein the roller has a shaft defining an axis of rotation and a plurality of substantially parallel plates coaxially mounted on the shaft, each plate of the plurality of plates being spaced away from an adjacent plate of the plurality of plates, defining a space therebetween, wherein the roller is designed such that the at least one plate dips at least partially into the water, in order for the moistened part exiting with further rotation from the water to release the water through cold evaporation of the air to be dehumidified, wherein the roller comprises a filter cartridge, which is designed for filtering water for use in a humidifier or the like, with a storage space for the storing of filter material, the filter material including at least ion exchange resin, activated carbon or the like, and with at least one opening, in order to supply the water to be filtered to the storage space and/or to release it from the storage space, wherein the filter cartridge is designed to be arranged in the tank with water to be filtered, so that the filter cartridge can protrude into the water stored in the tank, wherein the at least one opening is designed both as water inlet for supplying water from the tank into the storage space as well as the water outlet for release of water from the storage space into the tank, wherein a mounting device is provided to be mounted in the tank, the mounting device defining a hub for fastening to the shaft and/or axis of rotation, wherein the filter cartridge is coaxially mounted on the shaft substantially parallel with the plurality of plates, wherein the filter cartridge having the at least one opening is arranged in and/or on the tank such that the water absorbed by the filter cartridge from the tank for the filtering is released again into the tank to the water which has not yet been absorbed, and wherein the humidifier is configured to blow air from a top portion thereof in a direction substantially perpendicular to the shaft to contact at least one of the plates.

3. The humidifier according to claim 2, wherein the filter cartridge is designed as a disk, which is designed substantially rotationally symmetrical to the axis of rotation.

4. The humidifier according to claim 3, wherein the disk has an edge and at least one transport structure is designed as a spoke between the hub and the edge.

5. The humidifier according to claim 2, wherein the filter cartridge has at least one transport structure for the absorption and release of water.

6. The humidifier according to claim 5, wherein the at least one transport structure runs radially outwards and simultaneously curved in relation to the axis of rotation, so that the at least one transport structure can absorb the water in a bucket-like and/or spoon-like manner.

7. The humidifier according to claim 5, wherein the at least one transport structure is designed for the purpose of transporting water absorbed in a rotation about the axis of rotation in at least one direction of rotation in an upper area thereof in the direction of gravity and for the purpose of releasing the water there from the transport structure, so that the water can flow downwards along the filter cartridge.

8. The humidifier according to claim 5, wherein the at least one transport structure is designed as a separation wall for the separation of individual compartments within the storage space.

9. The humidifier according to claim 2, wherein at least one of the at least one opening is delimited by a net-like, water-permeable material.

10. The humidifier according to claim 2, wherein the filter cartridge is designed to be openable and re-closable, in order to be able to empty and refill the storage space.

11. The humidifier according to claim 2, wherein the filter cartridge is designed and/or is fastened to the shaft in such a manner that a bulge side of the curvature of at least one transport structure is on a side facing away in the direction of rotation.

12. The humidifier according to claim 2, wherein the filter cartridge is arranged parallel to at least one of the at least one plates.

13. A method for the filtering of water, in particular for the water softening and/or purification of water, in a tank for the storage of water in a humidifier or the like, wherein a tank for storage of water and a filter material wherein the filter material is moved in such a manner that it is dipped periodically at least partially into the water and is removed again from the water, wherein a humidifier is used according to claim 2.

* * * * *